AERODYNAMIC AIRCRAFT BRAKE

Original Filed Oct. 1, 1953 4 Sheets-Sheet 1

INVENTOR.
GEORGE J. HAND, SR.
BY Frank H. Borden
ATTORNEY

AERODYNAMIC AIRCRAFT BRAKE

Original Filed Oct. 1, 1953 4 Sheets-Sheet 2

INVENTOR.
GEORGE J. HAND, SR.
BY Frank H. Borden
ATTORNEY

AERODYNAMIC AIRCRAFT BRAKE

Original Filed Oct. 1, 1953 4 Sheets-Sheet 3

INVENTOR.
GEORGE J. HAND, SR.
BY Frank H. Borden
ATTORNEY

AERODYNAMIC AIRCRAFT BRAKE

Original Filed Oct. 1, 1953 4 Sheets-Sheet 4

INVENTOR.
GEORGE J. HAND, SR.
BY Frank H. Borden
ATTORNEY

United States Patent Office

Re. 24,561
Reissued Nov. 11, 1958

24,561

AERODYNAMIC AIRCRAFT BRAKE

George J. Hand, Sr., Baltimore, Md., assignor, by mesne assignments, to Decelo-Chute Corp.

Original No. 2,729,409, dated January 3, 1956, Serial No. 383,431, October 1, 1953. Application for reissue October 1, 1957, Serial No. 687,834

10 Claims. (Cl. 244—113)

Matter enclosed in heavy brackets [ ] appears in the original patent but forms no part of this reissue specification; matter printed in italics indicates the additions made by reissue.

This invention relates to an aircraft brake and particularly to a canopy-type brake adapted to be contained in a tubular housing and projected into the wind stream or retrieved into the tubular housing as may be desired.

In the landing of aircraft, particularly high speed aircraft, it is very desirable that means be provided for braking the speed of the aircraft as it comes in for a landing. Heretofore many types of landing devices have been provided for braking the speed of aircraft and various types of decelerating chutes have been attached to aircraft for this purpose. However, the heretofore known decelerating chutes have been highly unsatisfactory in operation and cumbersome and dangerous to use.

In the construction according to the present invention *a movable device is formed comprised of* a decelerating chute [is] housed in a tubular member *and a pilot chute engaging the end of said tubular member* which *device* may be withdrawn *bodily* out of the airstream *into an inoperative position within the aircraft against a bias urging the device* [and biased] into operative position, so that when [it] *the device* is released it will project the *pilot* chute *end of the device out of the aircraft* into the air stream so that [a] *said* pilot chute *will be exposed to the relative air stream and* will pull the brake chute out of the tubular housing and cause it to expand to apply braking [pressure] *drag* to the aircraft. After the aircraft has been [stopped] *decelerated* the *decelerating* chute may be readily retrieved *into the tubular housing while forcing the pilot chute against the end of the housing* and [at the same time] *synchronously* withdrawing the [projectile housing] *device into the aircraft* so that the entire device will be stored indoors and without danger of being accidently whipped out during maneuvering of the aircraft.

It is accordingly an object of the invention to provide an improved aircraft brake.

It is a further object of the invention to provide an improved housing for a brake chute.

It is a further object of the invention to provide a retrieving device for retrieving a chute after being used and means for housing the retrieved chute.

It is a further object of the invention to provide a [tractor] *tractile* housing for storing the housed chute *and its pilot chute as a unitary device* indoors *in the aircraft.*

It is a further object of the invention to provide means for jettisoning the chute in the event of emergency.

Other objects and many of the attendant advantages of the present invention will be apparent from the following detailed description taken in conjunction with the accompanying drawing in which:

Figure 2 is a perspective view of the chute control apparatus in loaded position *as a biased unitary device, in its attitude of complete housing indoors of the aircraft;*

Figure 3 is an enlarged sectional elevation through the loaded chute projector taken substantially on the plane indicated by the section line 3—3 of Figure 2, *as the unitary device is housed indoors in the aircraft, as is also shown in dotted lines in Figure 7;*

Figure 4 is a cross section through the projector taken substantially on the plane indicated by the section line 4—4 of Figure 3;

Figure 1:
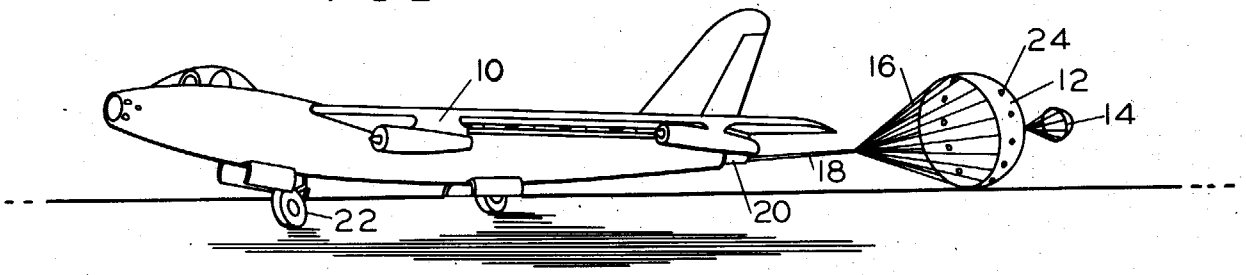
Figure 1 is a side elevation of an aircraft landing by the aid of the decelerating chute according to the invention.
Figure 6:
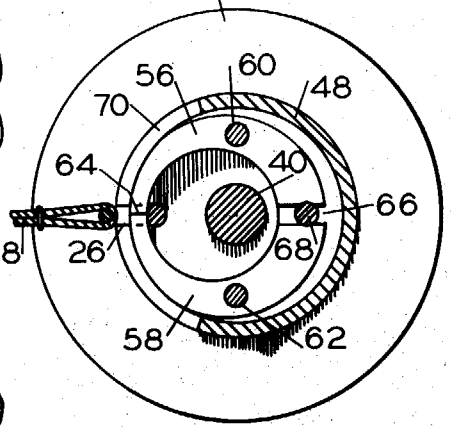
Figure 6 is a cross section through the release taken substantially on the plane indicated by the section line 6—6 of Figure 2.
Figure 5:
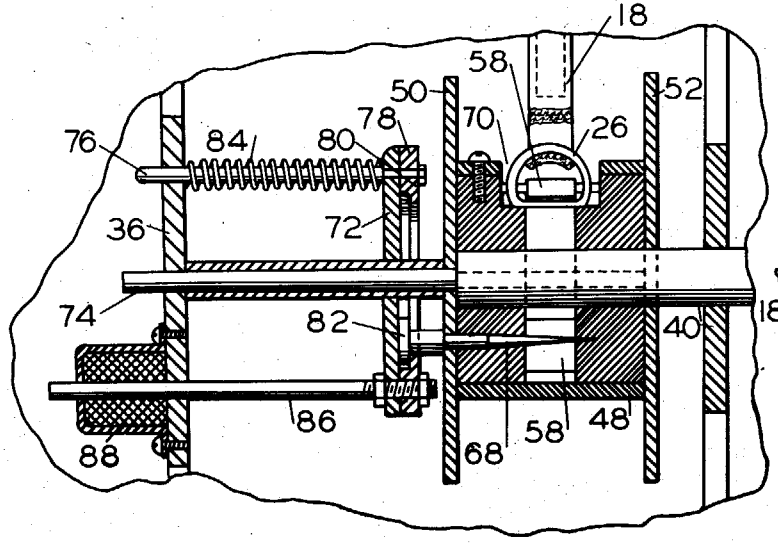
Figure 5 is a longitudinal section through the jettison release jaws taken substantially on the plane indicated by the section line 5—5 of Figure 3.
Figure 6:
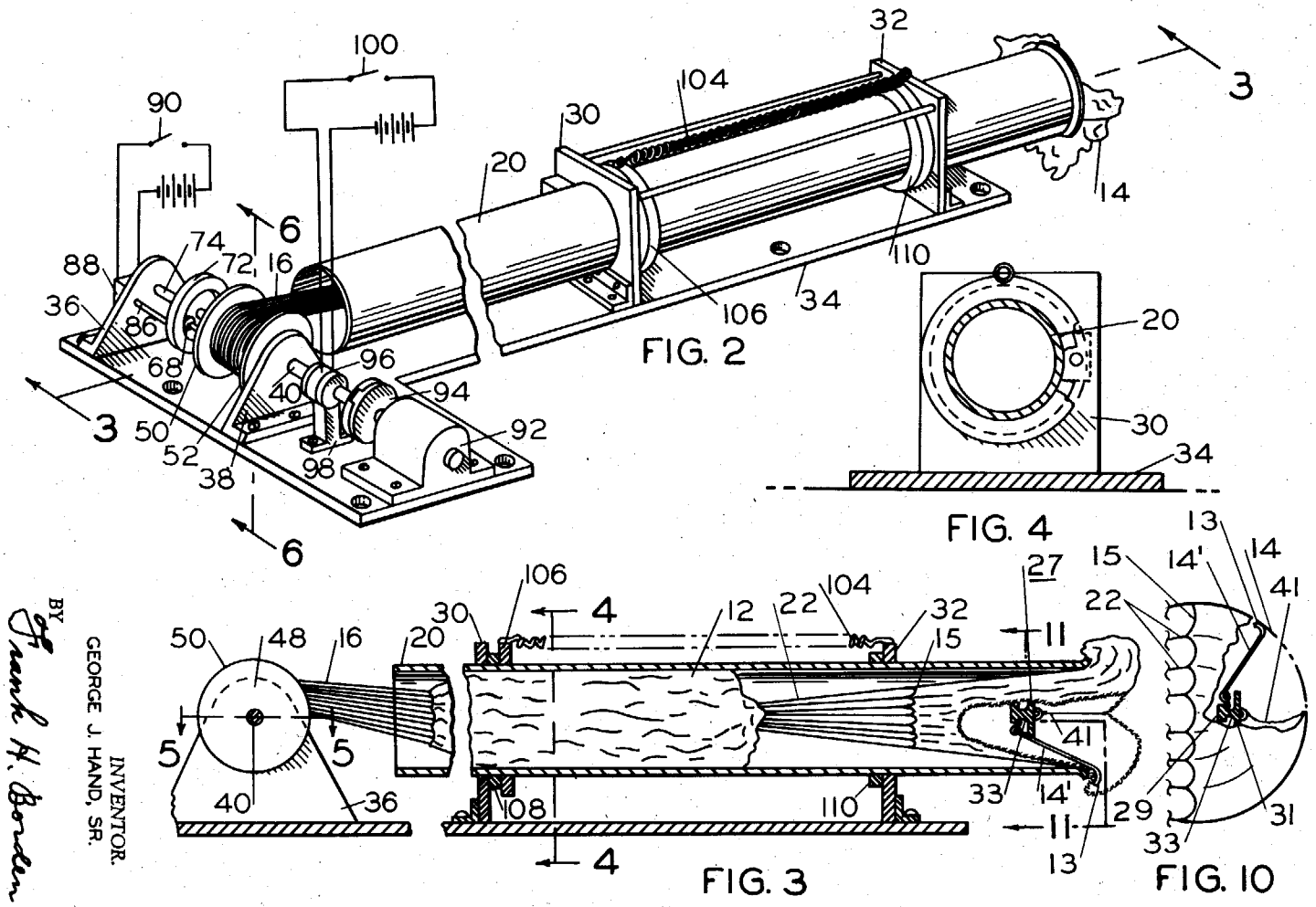
Figure 7:
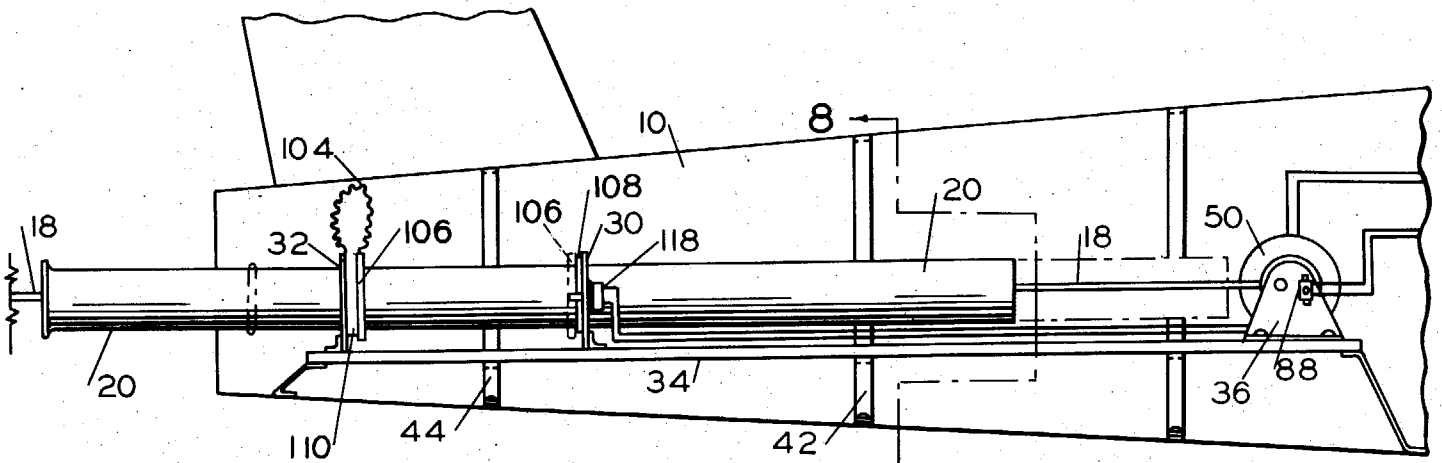

Figure 7 is a side elevation of the [projector in released position] *device in its relation to an illustrative aircraft, showing in dotted lines the complete assembled device, as shown in Figure 3, in its inoperative position indoors in the aircraft with the pilot chute out of contact with the airstream, and showing in full lines the tubular housing of the device in its bodily projected operative position with the outer end thereof disposed in the air stream, with the pilot and deceleration chutes disassembled therefrom and not shown herein, but being rearwardly disposed in the general positions thereof indicated in Fig. 1;*

Figure 8:
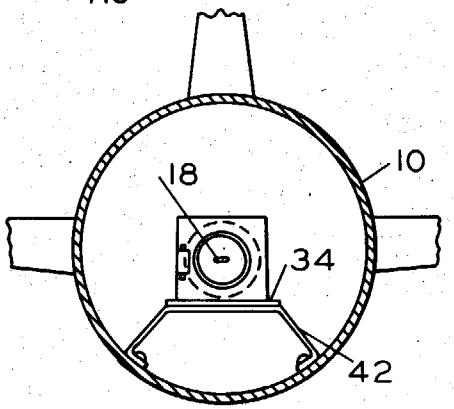

Figure 8 is an end view of the projector taken substantially on the plane indicated by the section line 8—8 of Figure 7; [and]

Figure 9:
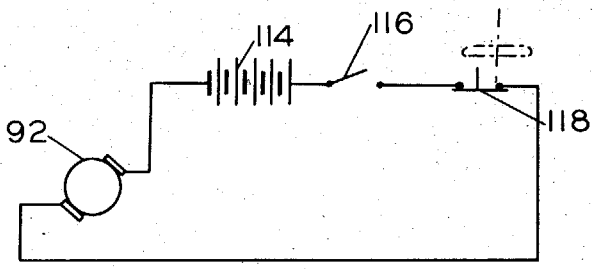

Figure 9 is a schematic diagram of the retriever circuit[.]*;*

*Figure 10 is an elevation of the pilot chute in its fully inflated condition, broken away to show the illustrative spring rib organization thereof; and*

Figure 11:
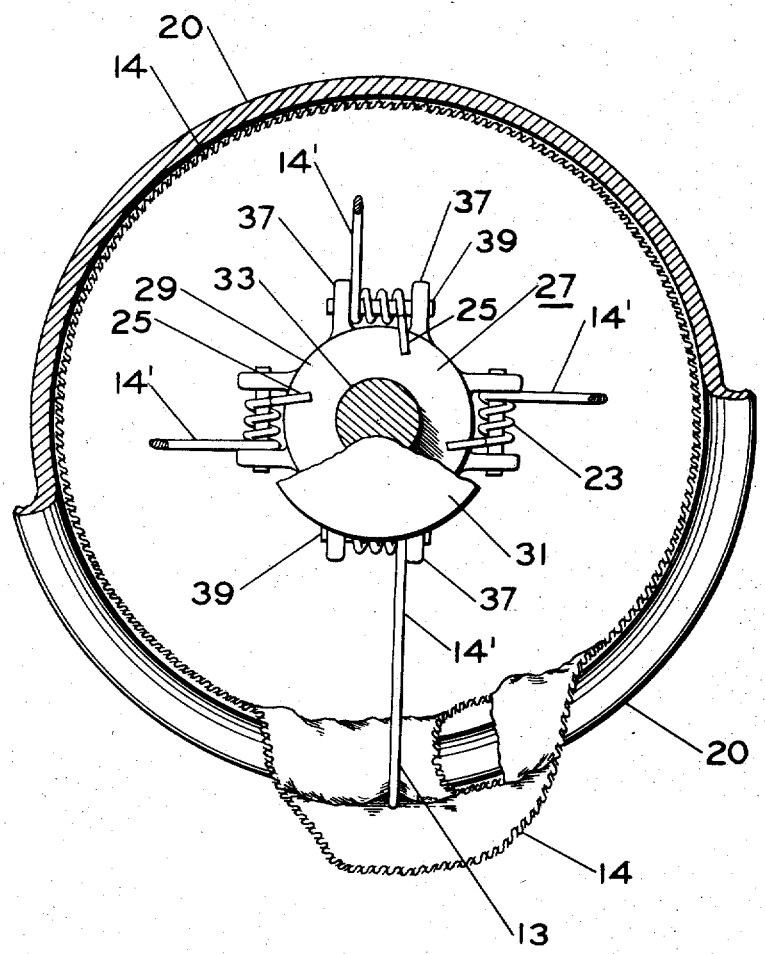

*Figure 11 is a fragmentary plan of a portion of the spring rib mount showing the relation of the spring rib thereto.*

In the exemplary embodiment according to the invention, an aircraft 10 herein shown as of the reaction propelled type is provided with a load decelerating or brake chute 12 having a pilot chute 14 attached thereto and being provided with a plurality of shroud lines 16 which are connected to a control line 18 which extends through a tubular housing 20. Preferably the aircraft 10 is provided with landing wheels 22 so that the craft may be propelled along a surface after landing.

The brake chute or load chute 12 is provided with a plurality of load relief valves 24 so that the chute 12 is protected against shock when being projected into the airstream and opened at high speed. The shroud lines 16 are connected to the control line 18 which is preferably a nylon strap of suitable width which is connected to a D ring 26 for connecting with the jettison jaws presently to be described.

The tubular housing member for the chute 12 is provided with a pair of guide brackets 30 and 32 which are mounted on a suitable base 34 which is adapted to be mounted within the aircraft. The base 34 is preferably of T-shape formation and has mounted thereon a pair of upstanding brackets 36 and 38 in which is journalled a shaft 40. The [platform] *base* 34 may be [mouned] *mounted* in the aircraft 10 by any suitable means such as the mounting brackets 42 and 44 (Figures 7 and 8). A winding drum 48 is mounted on the shaft 40 and rigidly attached thereto and is preferably of substantial hollow construction and has the end members 50 and 52. The control line 18 having the D-ring 26 is connected to the drum 48 by means of a pair of arcuate jaws 56 and 58 mounted on the interior of the drum [38] *48* by means or pivot pins 60 and 62. The pivoted jaws 56 and 58 [are provided with forwardly leaning jaws 64 and rear openings] *at their forward ends normally tightly abut at 64, and at their rear ends are spaced to define an opening* 66. A tapered wedge 68 is adapted to slide transversely of the opening 66 and forces the jaws [64 into closed position] *56 and 58 about their respective pivots 60 and 62 to maintain their tight abutment at 64* so that the D ring 26 may be rigidly retained in the drum which is provided with an aperture 70 for receiving the D ring 26. For controlling the wedge 68 a guide track 72 is journalled on a guide shaft 74 and maintained in non-rotative position by means of suitable guide pins 76. The guide plate 72 is provided with a forward track 78 which provides an annular groove 80 and in which slides a head 82 of the tapered wedge 68. Springs 84 positively urge the plate 72 along the shaft 74 toward the drum 48 so that the wedge 68 is urged to penetrate [a transverse position] *transversely* between the jaws 56 and 58 so that the jaws [64] are pressed into firm relation *at 64* to retain the D ring 26. An actuating rod 86 is connected to the plate 72 and is controlled by means of a solenoid 88 which will be controlled by means of a manual switch 90 so that the operator may *electromagnetically withdraw the wedge 68 from between the jaws 56 and 58, permitting the jaws to separate at 64 to release the* D *ring 26, and thereby to* jettison the chute at any time to prevent undue stresses to his craft.

The drum 48 is driven by an electric motor 92 which is mounted on the base 34 and has a *pilot controlled* clutch 94 in driving relation with the shaft 40 and a magnetic clutch 96 is mounted on a standard 98 and controls the position of the shaft 40. The magnetic clutch or brake 96 being controlled by a control switch 100 under the control of a pilot of the vehicle.

The tube 20 being slidable in the brackets 30 and [42] *32* is provided with resilient or biasing means 104 which positively urge the tube 20 to a projected position because of the connection of the resilient means 104 with the guide bearing 32 and a collar 106 fixed on the tube 20. Resilient bumpers 108 and 110 are mounted on the [bearings] *brackets* 30 and 32 respectively so that the collar 106 will be cushioned when it comes in contact with either of the [bearing plates] *brackets* 30 or 32.

The motor 92 is supplied with energy from any suitable device such as the battery 114 and is controlled by means of a pilot control switch 116 and an automatic stop switch 118.

*The pilot chute 14 encloses a plurality of spring ribs 14', biased outwardly from a common center. Each rib extends from an outward downwardly hooked end 13, across a lower eye 23, formed of several turns of the resilient wire comprising the rib, and to termination in a spring finger 25. A mounting spool 27 is provided, having a lower flange 29, an upper flange 31, preferably larger than flange 29, and a connecting strut 33. The lower flange 29 mounts pairs of generally radial ears 37. Pins 39 pass respectively through each pair of ears and through the eye 23 of the instant rib. The spool 27 connects to the apex of the pilot chute 14 by a flexible line 41, and each hook portion or end 13 is connected to the inner surface of the pilot chute 14 well above the peripheral margin 15 thereof. The pilot chute 14 is connected to the apex of the deceleration chute 12 by shroud lines 22. Under conditions of inflation of the pilot chute*

*14, the spring ribs 14' extend at small angles to a common horizontal plane containing the pins 39, and the relation of rib 14' to its terminal spring finger 25 is of optimum angularity, but under bias toward increasing relative angularity. In this condition of inflation the spring ribs extend appreciably beyond the tube 20 in a projection of the latter. When the deceleration parachute 12 is pulled into the then projected tube 20, tension is applied to the shroud lines 22 of the pilot chute 14, and as these shroud lines are drawn into the open end of the tube 20 they begin to pull the peripheral margin 15 of the pilot chute 14 thereinto. At a predetermined point in the inward convergent motion of the pilot chute the springs ribs 14' are caused to bear (through the pilot chute) against the end of tube 20. Continued inward motion of the pilot chute into tube 20 causes progressive flexing of the spring ribs against the resistance of the spring fingers 25. As this increases the downward force against the lower flange 29 of the spool, the latter is biased downwardly, exerting tension on the flexible line 41 which pulls in the apex of the pilot chute canopy and thus enhances the "spilling" of the air, initiated by the convergence of the peripheral margin 15 of the pilot chute. At a desired point in the inward motion of the pilot chute the hook portions* 13 *of the spring ribs overlie and engage the end of the tube 20. At this point the spring ribs 14' have a wide angle of divergence from the horizontal plane containing the pins 39 and the angular relation of the ribs 14' to the spring fingers 25 is most acute. At this point also the larger upper flange 31 has abutted the respective spring ribs 14' and anchored each in its hooked engagement with the end of tube 20. The pilot chute is then mostly within tube 20, and continued tension on the deceleration chute 12 through shroud lines 22 and pilot chute 14 forcibly retracts tube 20 into the aircraft.*

In the operation of the construction according to the device, the control line 18 will be passed through the tubular housing [40] *20* and the D ring will be positioned in the jaws 56 and 58 and the wedge 68 will be moved into position to lock the D ring in position. [Closing the switch 116 will then start the motor 92 which will wind up the control line 18 and the shroud lines 16 into] *Having clutch 94 engaged, closing the switch 116 will start the motor 92 driving drum 48 on which control line 18 and shroud lines 16 will be wound as they are drawn through* the tube 20 and cause the decelerating chute 12 to be moved into [housing] *housed* position in the tube 20. The [parachute] *flexible fabric pilot chute 14, of greater effective diameter than the end of the tube 20, by reason of spring ribs 14'*, will then come in contact with the end of the housing tube 20, and because of the springs ribs 14' therein will engage the end of the housing 20 and cause the housing 20 to move [forward] *inward* against the tension of the spring 104 *until it is inside the body of the aircraft.* When the housing *containing the deceleration chute and mounting the pilot chute engaging the housing, as an assembled device* has moved into completely [retrieved] *retracted* position *within the aircraft*, the collar 106 will actuate the switch 118 so as to decontrol the motor 92 and allow the magnetic clutch 96 to actuate to engage the shaft 40 *as a brake* and prevent its turning. *This anchors control line 18 under tension from springs 104.* When the aircraft comes in for a landing the pilot will [energize] *actuate* the clutch 96 [and disconnect the reel 48 from the motor 92 which will release the tube 20 which under the impetus] *disengaging shaft 40 and allowing it to turn. Simultaneously clutch 94 is disengaged disconnecting motor 92 from shaft 40 and allowing the drum 48 to turn without restriction and thus releases the tension on the control line 18 and therefore on the tube 20 which under the force* of the springs 104 will project the end of the tube *mounting the pilot chute 14* outwardly through *and from* the body of the aircraft into the slip *or relative air* stream so that the pilot chute 14 will be entrained by the slip stream which will pull the chute 12 out of the tube 20 which will distend to the full length of the shroud 16 and the control line 18. The opening of the chute will be controlled by means of a relief valve 24 so that the sudden shock will not destroy the canopy and the load will be gradually applied thereto so that the valves 24 may close and the chute or canopy retain its complete effectiveness over varied load or speed range so that the device will be operative as a brake at high speed with the valves open and effective at low speed with the valves closed so that over the complete stopping interval the decelerator chute 12 will be effective to control or reduce the speed of the aircraft 10.

In the event of emergency when it would be necessary for the aircraft to immediately take off again, or in case the chute 12 should become fouled or otherwise disabled, the pilot may readily jettison the chute 12 by [pressing the] *simultaneously disengaging clutches 94 and 96 and closing* switch 90 so that the wedge shaped rod will be withdrawn from between the jaws 56 and 58 allowing the jaws [64] to open *at 64* and drop the D ring 26 so that the craft will be immediately free of the restraint of the chute.

For purposes of exemplification a particular embodiment of the invention has been shown and described according to the best present understanding thereof. However it will be apparent to those skilled in the art that various changes and modifications may be made in the construction and arrangement of the parts thereof without departing from the true spirit and scope of the invention.

What is claimed as new is as follows:

1. A deceleration brake for an aircraft comprising a canopy, shroud lines on said canopy, an automatic pilot chute attached to said canopy, a control line attached to said shroud lines, a storage tube for said canopy, mounting brackets adapted to mount said tube in an aircraft, said tube having limited sliding movement in said brackets whereby the outer end of said tube is movable to a *first* position within or a *second* position outside the body of an aircraft, said control line extending through said tube, a [reel] *drum* mounted in alignment with said tube, biasing means urging said tube to [distended] *its second* position, means for operating said [reel] *drum* to [retrieve] *retract* said control line to store said canopy in said tube, *means on* said pilot chute engaging said tube whereby said tube is moved to retracted position, *and* controllable [jaws] *means* attaching said control line to said [reel] *drum*.

2. A deceleration brake for an aircraft comprising a canopy, shroud lines on said canopy, an automatic pilot chute attached to said canopy, a control line attached to said shroud lines, a storage tube for said canopy, mounting brackets adapted to mount said tube in an aircraft, said tube having limited sliding movement in said brackets whereby the outer end of said tube is movable to a *first* position within or a *second* position outside the body of an aircraft, said control line extending through said tube, a [reel] *drum* mounted in alignment with said tube, biasing means urging said tube to [distended] *its second* position, means for operating said [reel] *drum* to [retrieve] *retract* said control line to store said canopy in said tube, said pilot chute *incorporating means* engaging said tube whereby said tube is moved to [retracted] *its first* position, jettison jaws releasably attaching said control line to said drum, including a pair of arcuate jaws pivoted in said [reel] *drum*, a sliding wedge mounted transversely at one end of said jaws, and means for moving said wedge transversely of said jaws.

3. A deceleration brake for an aircraft comprising a canopy, shroud lines on said canopy, an automatic pilot chute attached to said canopy, a control line attached to said shroud lines, a storage tube for said canopy, said control line extending through said tube, a [reel] *drum* mounted in alignment with said tube, biasing means urging said tube to [distended] *extended* position, means for operating said [reel] *drum* to [retrieve] *retract* said control line to store said canopy in said tube, said pilot chute *comprising means* engaging said tube whereby said tube is moved to retracted position, jettison jaws releasably attaching said control line to said drum, including a pair of arcuate jaws pivoted in said [reel] *drum*, a sliding wedge mounted transversely at one end of said jaws, and means for moving said wedge transversely of said jaws, a head on said wedge, an annular guide receiving said head, biasing means urging said guide toward said [reel] *drum*, and means for moving said guide away from said [reel] *drum* to withdraw said wedge from between said jaws.

4. A jettison connection for attaching a line to a reel comprising a pair of jaws pivoted in said reel, said reel having a recess exposing one end of said jaws, a wedge movable into and out of contact with the other ends of said jaws, a head on said wedge, a guide track concentric with said reel, said head being received in said guide track, biasing means urging said guide track toward said reel to maintain said wedge in contact with said jaws, and means for moving said guide track away from said reel.

*5. A deceleration device for aircraft, comprising a parachute, a control line attached to said parachute, a pilot chute attached to said parachute, a storage tube for said parachute, storage-tube engaging means operatively associated with said pilot chute, said control line extending into said tube, means for guiding said tube for movement between a first position wherein the outer end of said tube is wholly within the body of an aircraft out of contact with the relative air stream and a second position in which said end is extended from said aircraft into contact with the relative air stream, means for moving said tube from its first to its second position, power means operative on said control line to pull said parachute into said tube for storage therein as said storage-tube engaging means associated with said pilot chute engages said tube to move said tube from its second into its first position.*

*6. A deceleration device as in claim 5, and means under the control of the pilot for detaching said parachute from said power means.*

*7. A deceleration device as in claim 5, in which the means for moving said tube from its first to its second position comprises spring means.*

*8. A deceleration device for aircraft, comprising a parachute, a pilot chute connected to said parachute, spring ribs on said pilot chute and a movable storage tube, said tube having limited motion in such aircraft between a first retracted position in which the outer end of said tube and said pilot chute are fully enclosed within the aircraft and out of the relative air stream thereover and a second extended position in which the said outer end and part at least of said pilot chute are outside of the aircraft and in the relative air stream whereby the pilot chute is engaged by the relative air stream to pull the parachute out of said tube and into drag-creating position in said relative air stream, and means for pulling said parachute into said tube and said spring ribs of said pilot chute into operative engagement with the end of said tube to move the latter into said first position.*

*9. A deceleration device as in claim 5, in which the pilot chute is of flexible fabric.*

*10. A deceleration device for aircraft, comprising a movable unit formed of a tubular member, a parachute disposed in the tubular member, and a pilot chute attached to the parachute susceptible to inflation and relative collapse, means mounted on said pilot chute overlying said tubular member in projection to establish that in its said relative collapse it is at least partially of greater diameter than and engageable with the end of the tubular*

*member, means mounting said unit for movement between a first retracted position wherein it is wholly enclosed within the aircraft out of contact with the relative airstream and a second extended position in which the outer end of said tubular member and a portion at least of the pilot chute are projected out of the aircraft and into the relative airstream in position to energize the pilot chute to withdraw the parachute from said tube for decelerating the aircraft, and means under the control of the pilot of the aircraft for selectively moving said unit between its respective positions.*

References Cited in the file of this patent or the original patent

UNITED STATES PATENTS

| | | |
|---|---|---|
| 1,024,676 | Burford | Apr. 30, 1912 |
| 2,513,867 | Heffernan | July 4, 1950 |
| 2,634,924 | Brown | Apr. 14, 1953 |
| 2,729,408 | Quilter | Jan. 3, 1956 |